United States Patent [19]
Jenkins

[11] Patent Number: 5,115,952
[45] Date of Patent: May 26, 1992

[54] DEVICE FOR PROVIDING LIQUID FLUID FOR CYCLISTS

[76] Inventor: John D. Jenkins, 5101 236th St., S.W., Mountain Lake Terrace, Wash. 93043

[21] Appl. No.: 557,794

[22] Filed: Jul. 26, 1990

[51] Int. Cl.⁵ .............................. B62J 7/00; B62J 7/06
[52] U.S. Cl. .................................. 224/32 R; 224/35; 224/36
[58] Field of Search .................. 224/32 R, 35, 36, 37, 224/39, 41, 148; 222/129, 145, 142.6, 144.5, 130, 135, 610; 24/30.5 P

[56] References Cited

U.S. PATENT DOCUMENTS

| | | | |
|---|---|---|---|
| 581,767 | 5/1897 | Powers | 224/148 |
| 3,206,074 | 9/1965 | Hoffmann | 222/130 |
| 3,572,660 | 3/1971 | Mahon et al. | 261/78 |
| 4,095,812 | 6/1978 | Rowe | 280/289 R |
| 4,274,566 | 6/1981 | Rowe | 224/35 |
| 4,477,950 | 10/1984 | Cisek et al. | 24/30.5 P |
| 4,629,098 | 12/1986 | Eger | 222/175 |
| 4,883,205 | 11/1989 | Saelens et al. | 224/32 R |
| 4,911,339 | 3/1990 | Cushing | 222/610 |

FOREIGN PATENT DOCUMENTS 0003058 12/1895 United Kingdom ............... 224/37
0013193 6/1898 United Kingdom ............... 224/36

Primary Examiner—Ernest G. Cusick
Assistant Examiner—David J. Walczak
Attorney, Agent, or Firm—William F. Frank

[57] ABSTRACT

The present invention comprises a container clamped to a forward bicycle frame member and containing at least one liquid replacer, a container cap having one tube inserted therein and extending interiorly of the container to the bottom thereof. The one tube is positioned within said cap so that the tube interior end is positioned within the container to maximize the intake of the liquid positioned within the container. The tube extends from the container to and through a clamp on the bicycle handlebars. The tube terminates above the handlebars in a mouthpiece which aids in drawing the at least one liquid from the container by the cyclist. In a multiple compartment container a multipler way valve connects the tubes within the container to the single tube extending from the container to the mouthpiece.

13 Claims, 3 Drawing Sheets

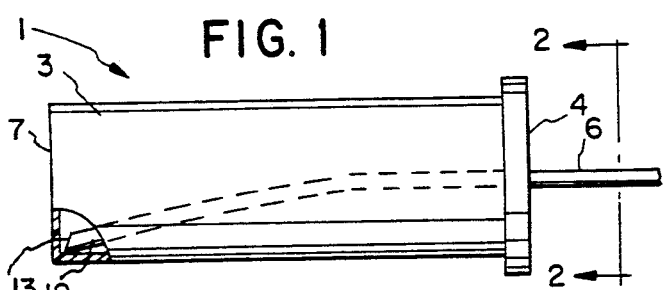
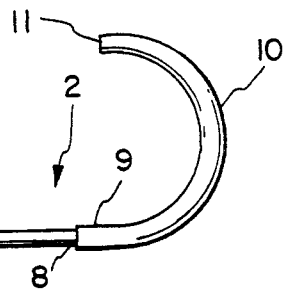
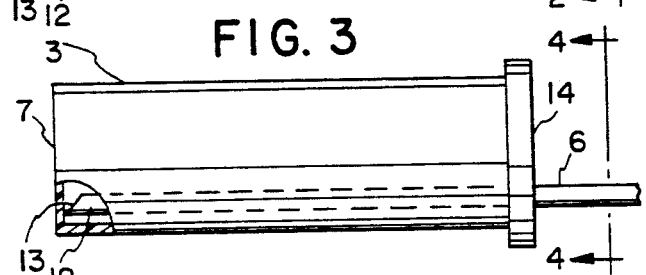
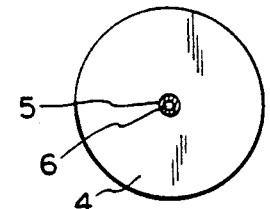
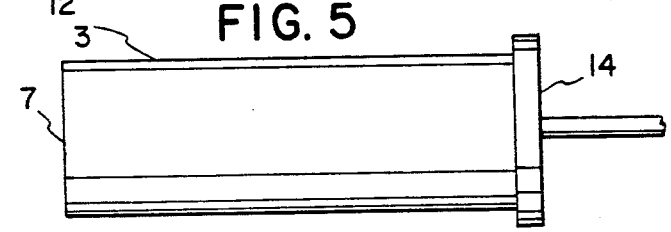
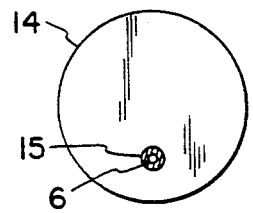
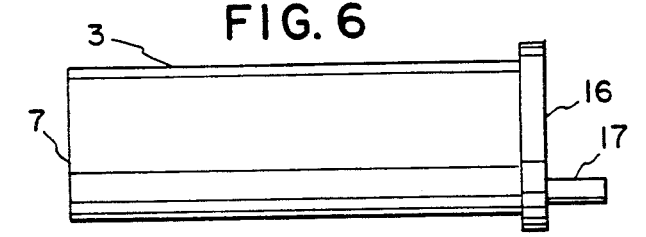
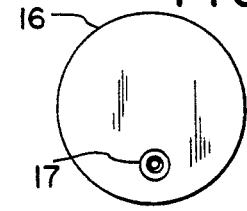
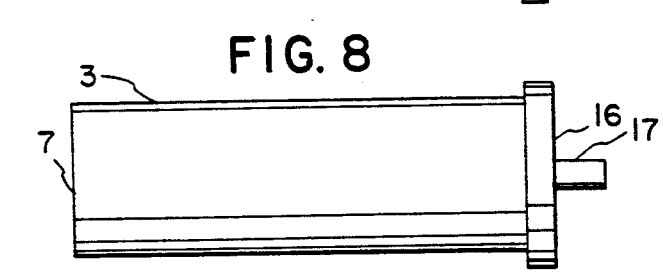
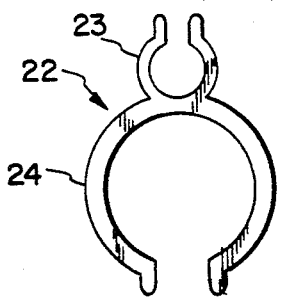
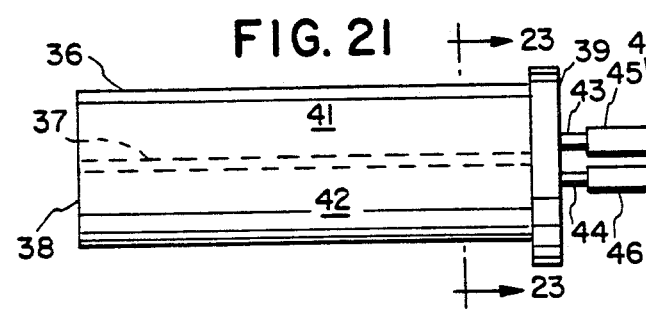
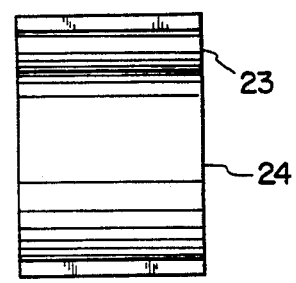

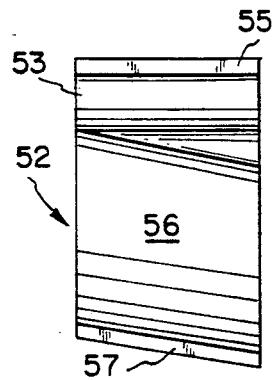
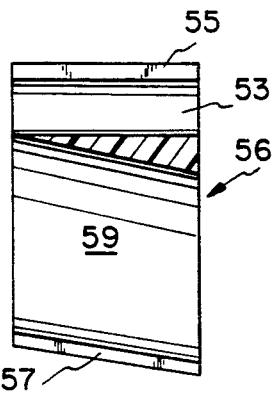
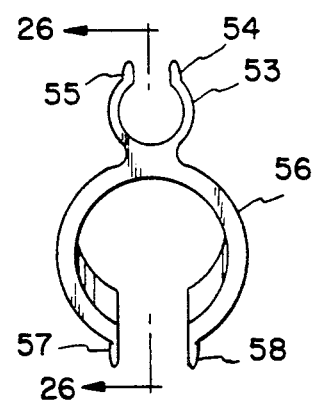
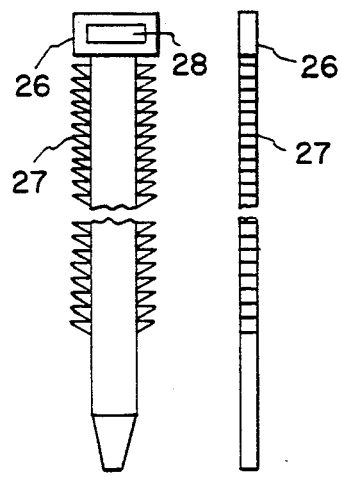
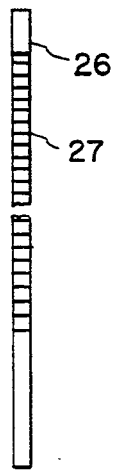
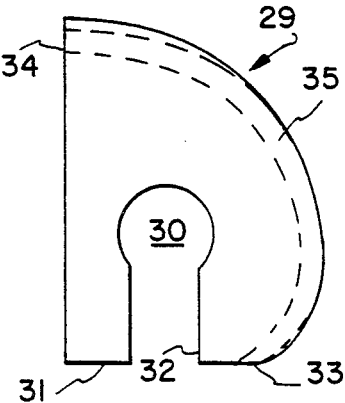
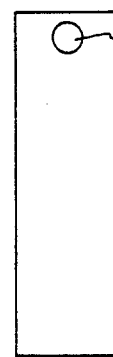
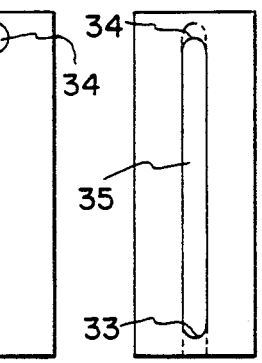
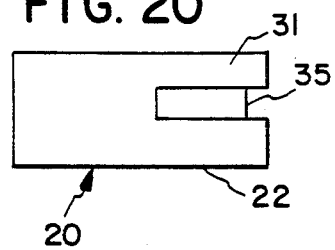
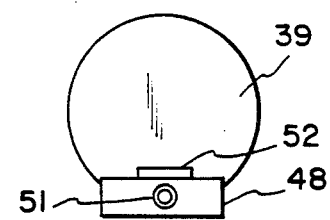
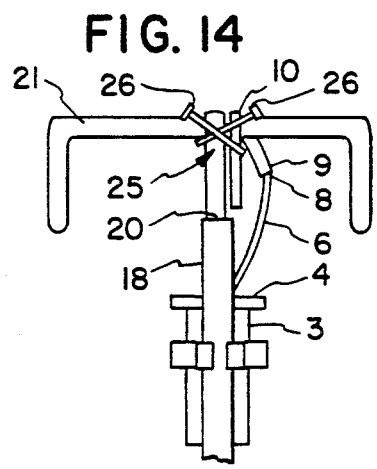
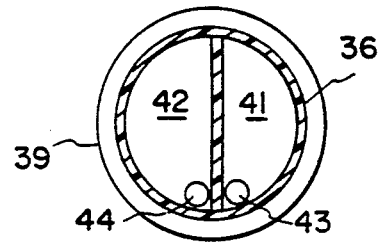

DEVICE FOR PROVIDING LIQUID FLUID FOR CYCLISTS

FIELD OF INVENTION

The present invention is in the general field of nutrition. More specifically, the invention provides a novel stem for supplying liquids to cyclists.

BACKGROUND OF THE INVENTION

For those who compete in such races as cycling and long distance running, the provision of liquids is not only important during the course but also presents problems in the provisions of liquids to compensate for the body liquids dispensed by the runners and cyclists during their races. The conventional systems for both categories of athletes is to provide cups of liquids at stations along the race course which are grasped and taken by the competitors. For the distance runners, the liquid supply is a open end cup which is quickly taken and cast aside. For cyclists, the problem is different. The cyclists attempt to maintain their speed by minimizing the slowing effect resulting from raising the upper torso to drink from the open end cup as do runners.

To minimize the effect on speed from raising the upper torso, various devices to replace the use of the open end cup have been developed.

The obvious initial improvement in providing the source of liquid replenishment was a plastic bottle clipped to the diagonal frame of a bicycle leading from the pedal hub to the handlebar hub. The bottle obviously had a cap for refilling and a nipple or outlet on the cap from which the cyclist could draw in the liquid. The bottle was held on the frame by a clip having one portion attached to the frame and an opposite portion with resilient arms or means which held the bottle by friction on the shape of the holder. U.S. Pat. Nos. 4,441,638, 4,345,704 and 4,366,922 are excellent examples of the prior art. The bottle supply technique in the prior art yet required the cyclist to raise his torso. None of the art referred to included a tube leading into the bottle and terminating in the cap to permit the cyclist to siphon the liquid into his mouth while yet in a modified crouch position.

U.S. Pat. No. 4,274,566 appears to be the only known art at this time which attempts to overcome the aforesaid shortcomings of the bottle/nipple art. This patent shows a supply bottle mounted on the bicycle frame bar between the pedal hub and the seat. A tube leads from the bottle to a rectangular box mounted on the bar between the seat and the handlebar hub. Inside the box the tube passes forward to a fixed pulley in the front end of the box, loops therearound and passes to the rear of the box where it passes around another pulley which is mounted in the box for slidable movement forward and return to the rear by biasing means connecting the rear of the box and the rear of the frame mounting the other pulley. To use this device, the cyclist grasps the end of the tube extending from the forward end of the box and pulls the tube forward. This motion pulls the rear mounted pulley forward to extend the tube. The cyclist holds the tube in this extended position by grasping the end with his teeth and then siphons the liquid in the bottle through the thus extended tube into his mouth. Once the tube end is in the cyclist's mouth he can resume his racing position. This patent requires the cyclist to momentarily lift one hand from the handlebars, pull the tube out from the box, grasp it with his teeth using the jaw muscles and then siphon the liquid. The distance the liquid must travel both vertically and horizontally plus the cumbersomeness of the device has not made it a popular item of use among cyclists.

SUMMARY OF THE PRESENT INVENTION

The present invention comprises a container clamped to a forward bicycle frame member and containing at least one liquid replacer, a container cap having one tue inserted therein and extending interiorly of the container to the bottom thereof. The one tube is positioned within said cap so that the tube interior end is positioned within the container to maximize the intake of the liquid positioned within the container. The tube extends from the container to and through a clamp on the bicycle handlebars. The tube terminates above the handlebars in a mouthpiece which aids in drawing the at least one liquid from the container by the cyclist. In a multiple compartment container a multiple way valve connects the tubes within the container to the single tube extending from the container to the mouthpiece.

BRIEF DESCRIPTION OF THE DRAWINGS

The present invention is illustratively shown in the accompanying drawings.

FIG. 1 is a front elevation view of the basic embodiment of the present invention, the rear, top and bottom views being a mirror image.

FIG. 2 is an end elevation view of FIG. 1, along the plane 2—2 in FIG. 1.

FIG. 3 is a front elevation view of another embodiment of the present invention, the rear view being identical.

FIG. 4 is an end elevation view of FIG. 3 along plane 4—4 in FIG. 3.

FIG. 5 is a top plan view of FIG. 3, the bottom view being a mirror image.

FIG. 6 is a front elevation view of a third embodiment of the present invention, the rear view being a mirror image.

FIG. 7 is a right end view in elevation of FIG. 6.

FIG. 8 is a top plan view of FIG. 6.

FIG. 12 is an elevation of one end of an embodiment of the new liquid container hanger of the present invention, the opposite end view being a mirror image.

FIG. 13 is a side elevation view of FIG. 12.

FIG. 14 is a top plan view of the securing of the exhaust portion of the liquid supply line of the present invention to the handlebars of a bicycle.

FIG. 15 is a top plan view of a strap used in FIG. 14.

FIG. 16 is a side elevation view of FIG. 15.

FIG. 17 is a front elevation view of a liquid supply line support bracket of the present invention, the rear view being a mirror image.

FIG. 18 is a right end elevation view of FIG. 17.

FIG. 19 is a left end elevation view of FIG. 17.

FIG. 20 is a top plan view of FIG. 17.

FIG. 21 is a top plan view of another embodiment of the liquid container of the present invention, the bottom plan view being a mirror image.

FIG. 22 is a right end view in elevation of FIG. 21.

FIG. 23 is a cross-section view along plane 23—23 in FIG. 21.

FIG. 24 is a side elevation view of another embodiment of the hanger of the present invention for a liquid container.

FIG. 25 is a right end view of FIG. 24.

FIG. 26 is a cross-sectional view of FIG. 24 along plane 26—26.

DETAILED DESCRIPTION OF THE INVENTION

Figure 9:
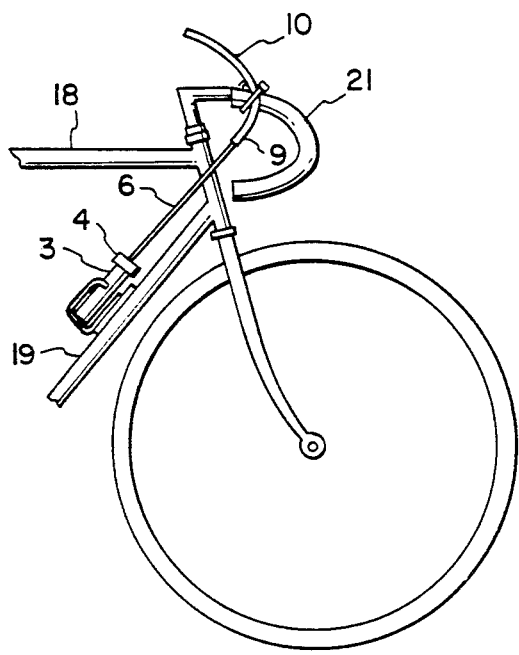
FIG. 9 is a front elevation view of a container of the present invention mounted on a bicycle, using a conventional wire holder bolted to the frame member, the rear view being identical.

With reference to FIGS. 1 and 2, this embodiment comprises a liquid source 1 and a supply line 2. The liquid source 1 comprises a cylindrical container 3 of a conventional type and a cap 4 which may be secured to container 3 by threads or a bayonet type connector. Cap 4 has a center opening into which a portion of the supply line 2 is inserted in frictionally sealing contact. Supply line 2 comprises two portions, intake portion 6 extending from the bottom 7 of container 3, through cap 4 to a juncture 8 where it is inserted into end 9 of exhaust portion 10 which terminates in end 11. Intake portion 6 of supply line 2 is flexible plastic tubing of conventional type. Exhaust portion 10 is a rigid plastic tubing formed into the arcuate shape shown. End 11 of portion 10 is uncovered for two reasons. The first and most important is that the cyclist needs only to place end 11 in this mouth and draw the liquid up through the supply line 2. The second reason is that as the bicycle moves forward through the ambient air, the air passing over the open end 11 may create a partial vacuum at end 11, which, if it occurs, could draw some of the liquid replenishment in container 3 up into intake portion 6 outside the cap 4. As will be noted in the breakaway portion of container 3 the innermost end 12 of portion 6 terminates in a diagonal cut 13. Diagonal cut 13 prevents the end portion 12 of portion 6 from sealing itself against the interior surface of end 7 of container 3 which would prevent flow of liquid replenishment from container 3.

Referring now to FIGS. 3, 4 and 5, in this second embodiment the difference between these FIGS. and FIGS. 1 and 2 is the cap 14 secured to container 3 as described with reference to FIGS. 1 and 2. Cap 14 differs from cap 4 in that intake portion 6 passes through an opening 15 in the peripheral portion of cap 14, opening 15 being so positioned in cap 14 that intake portion 6 lies along the interior wall of container 3. Other than this distinction the remaining description set forth above with reference to FIGS. 1 and 2 is identical.

With reference to FIGS. 6-8, in this third embodiment, the difference between these latter FIGS. and FIGS. 3-5 is the cap 16 which is secured to container 3 as previously described. The opening in cap 16 is formed by an outwardly extending nipple 17 over which the end of intake portion 6 is placed. This embodiment eliminates the segment of intake portion 6 which extends within container 3 as previously described. FIGS. 6-8 provide for an entirely new positioning of container 3 as will be subsequently described.

Figure 10:
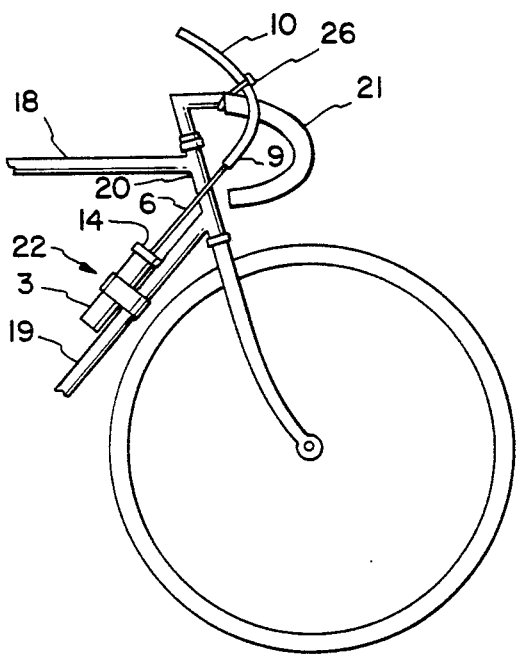
FIG. 10 is a front elevation view of FIG. 3 mounted on a bicycle using a new container holder of the present invention.

FIGS. 9 and 10 show the positioning of the embodiments in FIGS. 1-5 on a bicycle frame. The components of the bicycle frame are well known and require no additional identification. As seen, container 3 of both embodiments is identically positioned on the bicycle frame. The following description, in the interest of brevity, is equally applicable to both FIGS. 9 and 10.

Figure 11:
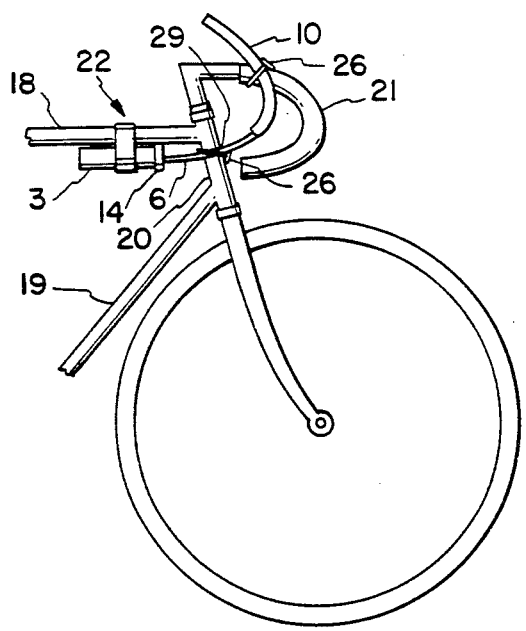
FIG. 11 is a front elevation view of an alternate mounting of the liquid container of the present invention.

FIGS. 9-16 show the mounting of the embodiments of FIGS. 1, 3 and 6 on the various frame elements of a bicycle. These are identified as the horizontal frame 18 extending from the seat post hub to the handlebar post/front wheel fork hub 20; the diagonal frame 19 extending from the pedal hub to hub 20 and the handlebars 21 positioned in hub 20. A container retaining means 22 comprises an integrally formed omega shaped frame clamp 23 and an omega shaped container clamp 24, the retaining means being formed from a resilient metal or thermoplastic material. The diameter of clamp 23 may vary in accordance with the diameter of the bicycle frame element. The exhaust portion 10 rests on the handlebars and can be secured thereto by an X-crossing of plastics ties 26, an example 25 of which is seen in FIG. 14 or well known plain plastic strips. Tie 26 has an advantage in that though sawtooth tab 27 can be pulled through slot 28 in tie 26 until the desired tightening of exhaust portion 10 to handlebar 21 is achieved. The tab 27 can be compressed laterally to release the sawtooth from contact with the outer edges of slot 28 and pushed back through slot 28 to release and remove exhaust portion 10 from contact with the handlebar 21. In some instances to provide greater stability to exhaust portion 10, intake portion 6 is secured to hub 20 by a circumferential wrapping 29 of a tie 26 about hub 20 as shown in FIG. 11. FIGS. 9 and 10 show container clamping means 22 positioned on frame 19. FIG. 11 shows clamping means positioned on frame 18. The position shown in FIG. 11 is preferable because container 3 is in a horizontal position and as such the liquid replenisher does not have to be siphoned along a vertical vector, this being particularly true when the embodiment of FIGS. 3 and 6 are used.

FIGS. 17-20 show a novel mounting bracket 29 for the exhaust portion 10. As seen in FIG. 17, the bracket is basically of a quadrant shape with an omega shaped opening 30 with opposing arms 31 and 32 on its lower edge. Opening 30 is fitted over one of the handlebars at the vicinity of the handlebar post in a frictional retaining fit. FIGS. 18-20 discloses an opening 33 on its lower edge and an opening 34 on its upper edge and a groove 35 interconnecting the two openings. The exhaust portion 10 is inserted into opening 33, inserted into groove 35 and extended toward the cyclist through opening 34. The bracket can be rotated about a handlebar to accommodate the cyclist so that he need only move his head to the end 11 of exhaust portion 10 to begin to draw in the liquid replenisher.

FIGS. 21-23 illustrate a novel liquid replenishment container 36. Container 36 is of conventional outer shape as in FIGS. 1-8. However, it differs from those containers 3 in that the interior of container 36 is divided in half by a wall 37 extending from the end 38 to the container opening (not visible). Container 36 is closed by a cap 39 having a peripheral opening therein (not visible) centrally positioned in relationship to each half 41, 42 of container 36 as was shown and described with reference to FIGS. 6-8. Each opening in cap 39 has a nipple 43, 44 extending outwardly therefrom as described with reference to FIGS. 6-8. From each nipple 43, 44 there extends a short tubing 45, 46 which terminates in a valve means 47. Valve means 47 comprises a valve body 48 having two nipples 49, 50 extending rearwardly toward cap 39 to receive tubing 45, 46 respectively. The forward side of valve body 48 has a nipple 57 to which an intake portion 6 is connected and which leads to exhaust portion 10. Valve body 48 contains a valve 52 which can be selectively positioned to provide access to tubing 45 or to 46 or to prevent access to either. Because of the dual compartment of container 36 cap 39 is connected to container 36 by a bayonet type junction (not visible but well known in the connector art) to insure the contents of container 36 can be properly discharged.

FIGS. 24-26 illustrate a second novel support 52 for the container shown and described with reference to FIGS. 1-8 and 21-23. This support provides that the containers 3 and 36 will be inclined downwardly toward handlebar/front fork hub, thus insuring that all liquid will flow to the respective cap openings to be drawn from the containers. Additionally, the downward inclination of the container will insure that the liquid(s) in the respective containers will enter into the intake portion 6 up to a level commensurate with the level of the liquid(s) in the container. Support 52 comprises an omega shaped bracket 53 having lips 54 and 55 to be clamped onto the horizontal bar connecting the seat post hub with the handlebar/front fork hub. Depending from bracket 53 is another omega shaped bracket 56 having lips 57 and 58. It will be seen that the opening 59 in bracket 56 is inclined downwardly.

Figure 27:
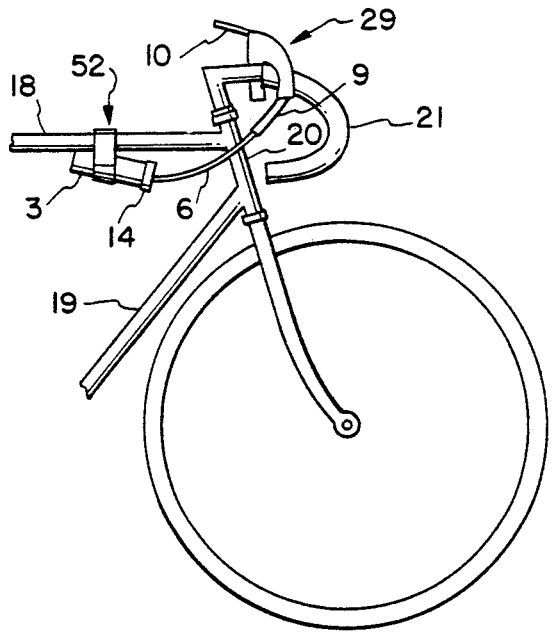
FIG. 27 is an elevation view of the present invention using any of the containers of the present invention with the support brackets of FIG. 17 and container hanger of FIG. 24.

FIG. 27 shows the present invention installed on a bicycle frame in a preferred position.

Such modifications as may occur to those of skill in the art are considered to be within the scope of the present invention as described therein and set forth in the appended claims.

What is claimed is:

1. A body liquid replenishment system for cyclists mounted on said cyclists' cycle comprising container means for said liquid replenishment mounted on said cycle, means to supply said liquid to a cyclist operatively connected to said container means and extending outwardly therefrom and directed toward said cyclist's face, means of securely position said container means on a frame member of a bicycle and means to secure one end portion of said supply means on said bicycle handlebars in proximity to a cyclist's head when said cyclist is in a racing position so that a cyclist can draw or suck said liquid replenishment from said container through said supply means, said supply means other end being connected to an end of said container, said container positioning means comprising a pair of clamping elements integrally formed in a back to back relationship of a resilient material, each clamping element having an omega shape, one of said omega shapes having an internal diameter minimally less than said frame member diameter to insure a frictionally secure fit with said frame member, said other omega shape having a diameter minimally less than said container means exterior diameter to insure a frictionally secure fit with said container means, said container omega shape clamping element having a longitudinal axis which is inclined downwardly and forwardly with reference to said bicycle frame member clamping element and a longitudinal axis thereof so that when said container is mounted on said frame said supply means is connected to the lowest part of said container means.

2. The system according to claim 1 wherein said container means comprises a cylindrical bottle having a closed end and an open end and cap means for said bottle, said cap means having means thereon to receive said liquid supply means other end portion to permit withdrawal of a liquid within said container.

3. The system according to claim 2 wherein said means to receive said supply means other end comprises a central opening on said cap means to engage said supply means other end portion in a frictional and sealing relationship.

4. The system according to claim 2 wherein said means to receive said supply means other end portion comprises an opening on the periphery of said cap means to engage said supply means other end in a frictional and sealing relationship.

5. The system according to claim 2 wherein said means to receive said supply means other end portion comprises an opening on the periphery of said cap means and an integrally formed nipple encompassing said opening and extending outwardly from said cap means outer surface to engage said supply means other end in a frictional and sealing relationship to maximize withdrawal of said replenishment.

6. The system according to claim 2 wherein said liquid supply means comprises plastic tubing, said one end portion being formed of a rigid tubing configured into an arcuate shape, one ned of said shape being positioned above said handlebars in proximity to said cyclist's head to give access to said liquid to said cyclists, the opposite end of said shape being joined to one end of a flexible member of said tubing, the opposite end of said flexible member being in contact with said cap means to permit withdrawal of a liquid replenishment in said container.

7. The system according to claim 6 wherein said opposite end of said flexible member passes through said cap means and terminates within said container at said container closed end, said flexible member opposite end terminal end having a diagonally cut terminus.

8. The system according to claim 6 wherein said opposite end of said flexible member is fitted upon a nipple extending outwardly from said cap means.

9. The system according to claim 1 wherein said securing means comprises a pair of clamping elements integrally formed in a back to back relationship of a resilient material, each clamping element having an omega shape, one of said clamp's omega shape diameter being minimally less than said frame member diameter to insure a frictionally secure fit with said frame member, said other clamp's omega shape diameter being minimally less than said container means exterior diameter to insure a frictionally secure fit with said container means, said clamping elements omega axes being parallel to each other in spaced apart vertical planes.

10. The system according to claim 1 wherein said means to secure said one end portion of said supply means on said bicycle handlebars comprises a pair of flexible plastic straps having buckle means on one end of each strap, said straps securing said one end portion to said handlebars in a X-shaped crossing of said straps about said handlebars and securing each strap within its respective buckle.

11. The system according to claim 9 wherein each strap is formed with a plurality of angular teeth along each strap longitudinal length.

12. The system according to claim 1 wherein said securing means comprises a bracket of thermoplastic resilient material having parallel spaced apart flat side surfaces, lower side portions of said bracket having a transversely formed omega shaped opening therethrough to frictionally and securely engage one of said handlebars, one end of said bracket having a flat surface with an opening on an upper portion and an identical opening on a lower surface to receive and hold said one end portion of said supply means, said bracket opposite end having an arcuate shape interconnecting top and bottom surfaces of said bracket, said opposite end having a groove therein interconnecting said top and bottom openings to receive said one end portion of said supply means.

13. The system according to claim 1 wherein said container means comprises a cylindrical bottle divided interiorly into two equal compartments and a cap means having a pair of peripheral positioned outwardly extending nipples integrally formed thereon, each nipple communicating respectively with one of said compartments, said cap means further having valve means with separate connections to each nipple for selective intake from said container compartments and an outlet from said valve means for connection to said liquid supply means.

* * * * *